United States Patent [19]
Cheng

[11] B 3,925,045
[45] Dec. 9, 1975

[54] MULTISTAGE CYCLONIC SEPARATOR
[75] Inventor: Paul J. Cheng, Bartlesville, Okla.
[73] Assignee: Phillips Petroleum Company, Bartlesville, Okla.
[22] Filed: Dec. 7, 1972
[21] Appl. No.: 313,098
[44] Published under the Trial Voluntary Protest Program on January 28, 1975 as document no. B 313,098.

[52] U.S. Cl. ............... 55/345; 55/391; 55/397; 55/398; 55/459
[51] Int. Cl.² ............................................. B01D 45/12
[58] Field of Search ............ 55/391, 392, 394, 397, 55/456, 457, 459, 336, 337, 318, 398, 322, 466, 345; 209/144

[56] References Cited
UNITED STATES PATENTS

| | | |
|---|---|---|
| 2,067,710 | 1/1937 | Jacobsen ........................... 55/459 X |
| 2,252,581 | 8/1941 | Saint-Jacques ................... 55/456 X |
| 2,708,033 | 5/1955 | Thomas ........................... 209/144 X |
| 3,283,480 | 11/1966 | Szego ............................... 55/392 X |
| 3,358,844 | 12/1967 | Klein et al. ....................... 55/456 X |
| 3,719,032 | 3/1973 | Cash ................................. 55/466 X |

Primary Examiner—Frank W. Lutter
Assistant Examiner—Kathleen J. Prunner

[57] ABSTRACT

A separator comprised of a chamber containing a plurality of superimposed conical sections of decreasing inlet diameters, the diameters of the sections forming passageways between the sections for the separation of particulate matter passed through the separator in helical flow.

2 Claims, 4 Drawing Figures

MULTISTAGE CYCLONIC SEPARATOR

This invention relates to a multistage cyclonic separator.

In one of its more specific aspects, this invention relates to a cyclonic separator which facilitates the separation of extraneous matter of high density from a stream containing particulate matter.

The use of multistage cyclonic separators is well known. One such type of separator employs a plurality of circumferentially-positioned openings around a central duct through which the stream is passed, a portion of the stream being separated through each of these openings or stages. One such separator is that dust collector disclosed in U.S. Pat. No. 3,283,480. The apparatus of the present invention is an improvement thereover.

The apparatus of the present invention is particularly adapted for separating extraneous grit from smoke produced from a carbon black furnace, the grit being of a higher density than the black. Accordingly, the invention will be explained in these terms without intending to limit the invention in any respect thereto.

The separator of the present invention comprises a chamber having an access opening thereinto. Positioned within the chamber is a sectioned cone comprised of a plurality of truncated conical sections. These conical sections are positioned on a plurality of radii, successive radii of the conical sections decreasing in length, the fluid being handled flowing downwardly through the conical sections along the vertical axis of the apparatus.

The conical sections have upper and lower portions, the lower portion having a smaller angle with respect to the vertical axis than the upper portion. Each conical section, excluding the uppermost conical section, has its upper rim lying within the lower rim of that conical section superadjacently positioned to it, the distances between adjacent rims forming removal passages for that grit centrifuged outwardly from the axis of the apparatus as the particulate matter flows downwardly in a helical flow pattern due to its tangential introduction. The grit is separated, passes, through the removal passages formed between adjacent rims and passes into a collection section positioned in encompassment thereto. Because of the conical configuration of the overall separation section of the present apparatus, as particulate matter is skimmed from the outer regions of the flowing mass, the mass velocity of the gases tends to be maintained substantially constant in compensation for the decrease in velocity which tends to accompany the decrease in mass flow. As a result, the efficiency of the present apparatus tends to increase, rather than decrease, in the lower portions of the apparatus.

The apparatus of this invention will be more easily understood if explained in conjunction with the attached drawings in which.

Figure 1:
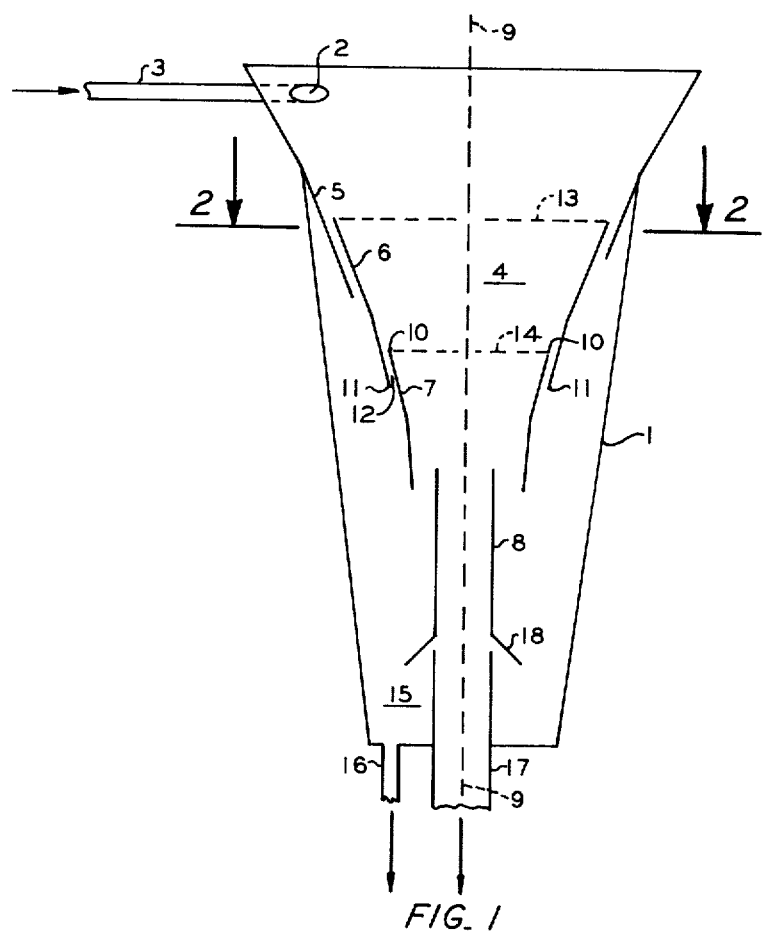
FIG. 1 is a view of the apparatus of this invention in elevation.
Figure 3:
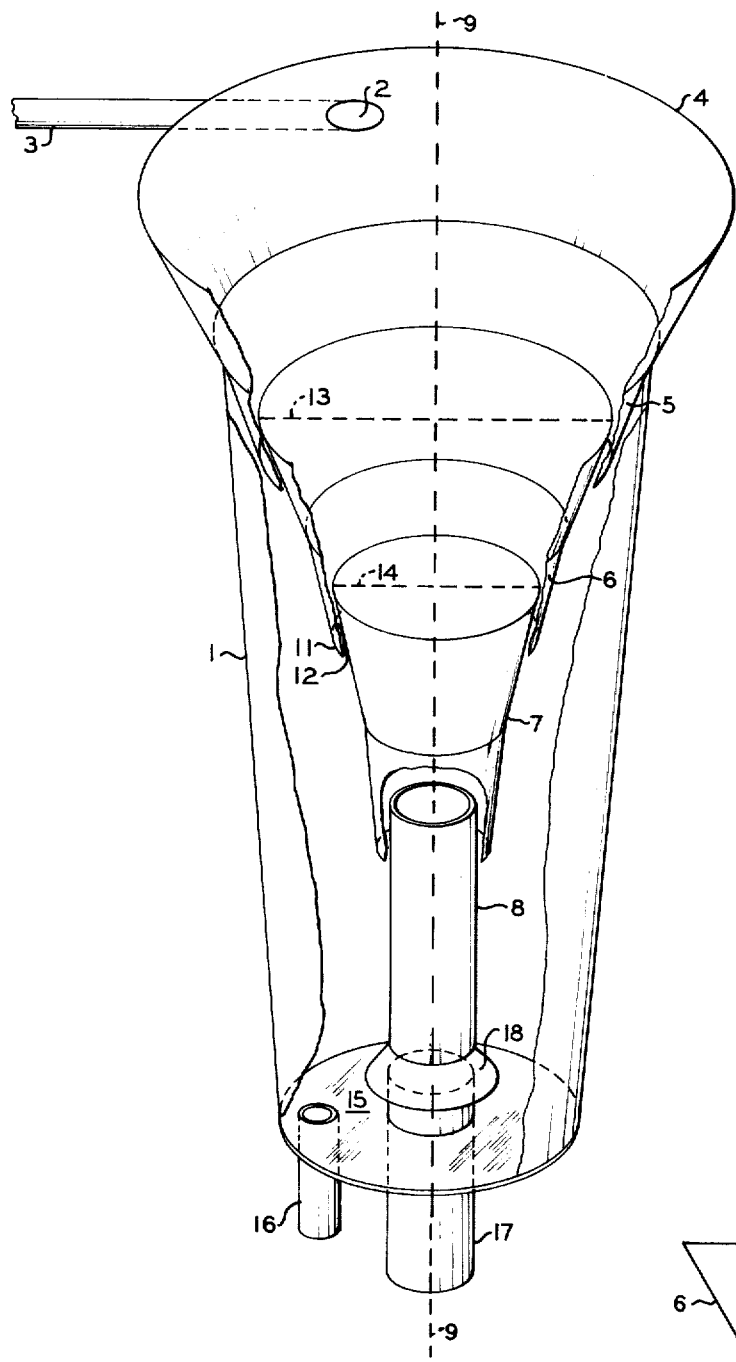
FIG. 3 is a perspective view of the apparatus.

Referring now to FIGS. 1 and 3 there is shown chamber 1 having access opening 2 tangentially discharging thereinto through conduit 3 to establish helical flow down through the apparatus. Positioned within the chamber is truncated cone 4 comprised of a plurality of conical sections 5, 6, and 7, and section 8 which, in one embodiment can be a conduit of substantially uniform diameter or, in another embodiment, can also be formed as a truncated cone. While only three conical sections are shown, any number of conical sections can be employed. The upper portion 20 of the uppermost conical section 5 forms the upper portion of chamber 1 and the lower portion 21 of conical section 5 extends angularly into the chamber and beneath the upper portion of conical section 6, thus forming a grit-passageway therebetween. Such passageways are discussed hereinafter. The lower portion of chamber 1 includes collection section 15 discussed hereinafter. Conical sections 6 and 7 are positioned on radii indicated by imaginary lines 13 and 14, these radii decreasing in length along the vertical axis of the apparatus in the downward direction. The vertical axis of the apparatus is indicated by imaginary line 9. The fluid being handled flows downwardly through the conical sections. Conical sections 6 and 7 have their upper rim lying within the lower rim of that conical section superadjacently positioned to it, that is, upper rim 10 of section 7 lying within lower rim 11 of section 6. This positioning forms passageway 12 between adjacent rims around the periphery of conical sections 6 and 7 through which the grit passes and accumulates in collection section 15, being removed therefrom by conduit means 16, the smoke being removed from the unit through outlet conduit 17.

Imaginary lines 13 and 14 are coincident with the upper rims of the conical sections 6 and 7. Each conical section, as will be seen from the drawing, is comprised of an upper portion 20 and a lower portion 21. The walls of the upper portion of each section are positioned at a first acute angle relative to the vertical axis of the separator, and the walls of the lower portion of each section are positioned at a second acute angle relative to the vertical axis, the second angle being less than the first angle.

Figure 2:
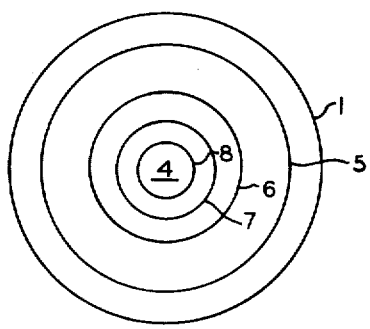
FIG. 2 is a view through section 2—2 of FIG. 1.

Referring to FIG. 2, it will be seen that the configuration of section 4 provides a decreasing flow area for the materials passing through the section with the result that the original velocity imparted to the feedstream is substantially maintained with minimum reduction in tangential velocity of the stream occurring as the stream passes through the apparatus.

The particulate-containing matter, here considered as carbon black smoke, can be introduced into the separator at any temperature and tangential velocity. Preferably, it will be introduced at a temperature of about 400° to about 500°F and a tangential velocity of about 200 to about 900 feet per second into an apparatus having an upper diameter proximate its tangential entry dependent upon the volume of smoke handled. Preferably, this diameter will be within the range of from about 1.5 to about 4.5 feet, the apparatus decreasing in diameter within the conical section to a diameter of about 5 to about 17 inches over any length depending upon the degree of separation required.

Figure 4:
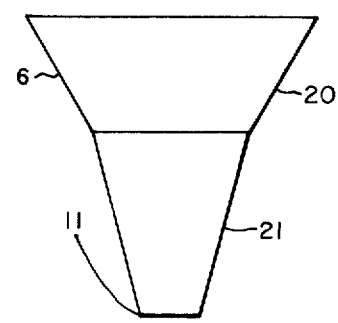
FIG. 4 is a view, in elevation, of one of the conical sections.

Preferably, the conical sections as shown in FIG. 4 will slope inwardly towards the vertical center line in a downward direction at an angle from as large as about 60° to as small as about 4°, depending upon the number of conical units employed. The sections overlap a distance within the range of from 0.2 to about 1 inch; the passageways between sections through which passageways the grit passes are from about 0.06 to about 0.3 inches in width. These passageways preferably will extend around substantially the entire periphery of the sections, the passageways being interrupted as necessary to provide positioning means for holding the conical sections in spaced arrangement.

The first or uppermost of the conical sections 5 can be positioned at any distance below the tangential entry although it is desirable to provide an opening tangentially discharging into the upper portion 20 of the uppermost of the conical sections, wherein this upper portion 20 slopes inwardly at an angle between about 20° and about 60° with respect to the vertical axis of the apparatus.

As mentioned, any number of conical sections can be employed. Each of these will have a height of between about 0.5 and about 2 feet and each can be positioned at a different angle in relation to the vertical axis of the apparatus.

The slope of the conical sections toward the vertical axis will decrease in a downward direction. The upper portion 20 of the uppermost conical section will usually make an angle with respect to the vertical axis in the range of about 20° to about 60°. The angle $\alpha$ formed between the portion 20 of the uppermost conical section and the imaginary extension of the upper portion 20 of the subadjacent conical section will usually be in the range of about 9° to about 27°; the angle $\beta$ formed between the upper portion 20 of said subadjacent conical section and the imaginary extension of the upper portion 20 of the next subadjacent conical section will usually be in the range of about 7° to about 21°; and the angle $\gamma$ formed between the portion 20 of said next subadjacent conical section and the imaginary extension of the cylindrical section will usually be in the range of about 4° to about 12°.

The size of the inlet and outlet conduits of the apparatus will depend upon the quantity and nature of the material being handled.

A typical apparatus suitable for handling about 500,000 SCF per hour of carbon black smoke at an inlet temperature of 450°F, an inlet pressure of 3 psig, and containing about 0.056 weight percent grit is as follows.

The smoke will be introduced into a separator having a diameter of about 2½ feet through a tangential entry providing an inlet velocity of about 680 feet per second.

The apparatus will contain three conical separation sections, the sections being about 1 foot in height. The upper portion 20 of the uppermost conical section will slope at an angle of 35°, measured from the vertical axis. The second conical section 6 will be positioned at an angle $\alpha$ of 15°, the third conical section 7 will be positioned at an angle $\beta$ of 12°. The cylindrical section 8, preferably flared at 18 at its lower end, will be positioned at 0° with respect to the vertical axis, making an angle $\gamma$ of 8°. The annular gap between overlapping units will be about 0.1 inch, the sections overlapping about 0.7 inch. Preferably, the upper rim of 6 should not extend above the imaginary extension of the lower portion 21 of upper conical section 5, this being so for each succeeding pair of similarly related sections.

The conical configuration of the unit can decrease to any suitable sized outlet for the exiting smoke. Preferably, the outlet will be of the same diameter as the cylindrical unit 8, when used. This lowermost cylindrical unit can be merely an extension of the removal conduit without the annular opening and flare portion 18. The grit collection system and its outlet conduit can similarly be of any suitable size.

In such an apparatus, smoke recovery will be about 490,000 SCF per hour containing about 0.004 weight percent grit.

It will be evident from the foregoing that various modifications can be made to the apparatus of this invention. Such, however, are considered to be within the scope of the invention.

What is claimed is:

1. A separator comprising:

a. a chamber;

b. a truncated cone comprised of a plurality of coaxially aligned conical sections of decreasing inlet diameters positioned in superimposed relationship, the upper portion of the uppermost conical section forming the upper portion of said chamber, the lowermost portion of said uppermost conical section and the remaining conical sections being positioned within said chamber, said truncated cone terminating within said chamber at an intermediate point along the vertical axis thereof, each of said conical sections having an inlet diameter greater than its outlet diameter, the lower portion of said uppermost conical section of said truncated cone extending angularly into said chamber and beneath the upper rim of the next lower conical section, each of the lower conical sections positioned within said chamber having its inlet or upper rim positioned within the outlet or lower rim of the next superimposed section to form an annular passageway therebetween, each of said conical sections consisting of an upper conical portion and a lower conical portion, the walls of said upper conical portion being positioned at a first acute angle relative to the vertical axis of said separator and the walls of said lower conical portion being positioned at a second acute angle relative to said axis, said second angle being less than said first angle;

c. a collection section in a lower portion of said chamber in open communication with said passageways;

d. first outlet conduit means opening downwardly from said collection section;

e. second outlet conduit means opening downwardly from said chamber, the upper terminus of said second outlet conduit being positioned within the lower portion of the lowest of said conical sections and in spaced relationship therefrom to form an annulus therebetween; and f. an inlet conduit means opening tangentially into an upper portion of said uppermost conical section forming the upper portion of said chamber.

2. The separator of claim 1 in which said second outlet conduit means comprises an upper member having a lower, outwardly extending portion proximate its terminus and a lower member having an upper terminus positioned within said lower, outwardly extending portion of said upper member.

\* \* \* \* \*